US010567249B1

(12) United States Patent
Bauan et al.

(10) Patent No.: US 10,567,249 B1
(45) Date of Patent: Feb. 18, 2020

(54) NETWORK PATH VISUALIZATION USING NODE GROUPING AND PAGINATION

(71) Applicant: ThousandEyes, Inc., San Francisco, CA (US)

(72) Inventors: John Moeses Ercia Bauan, San Francisco, CA (US); Sunil Bandla, San Francisco, CA (US); Ricardo V. Oliveira, San Francisco, CA (US)

(73) Assignee: ThousandEyes, Inc., San Francisco, CA (US)

( * ) Notice: Subject to any disclaimer, the term of this patent is extended or adjusted under 35 U.S.C. 154(b) by 0 days.

(21) Appl. No.: 16/356,677

(22) Filed: Mar. 18, 2019

(51) Int. Cl.
H04L 12/26 (2006.01)
G06F 3/0483 (2013.01)
H04L 12/24 (2006.01)

(52) U.S. Cl.
CPC .......... H04L 43/045 (2013.01); G06F 3/0483 (2013.01); H04L 41/22 (2013.01); H04L 43/08 (2013.01); H04L 41/12 (2013.01); H04L 43/00 (2013.01)

(58) Field of Classification Search
CPC ....... H04L 41/22; H04L 41/12; H04L 43/045; H04L 45/02; H04L 45/122; H04L 43/00; H04L 12/145; H04L 12/22
See application file for complete search history.

(56) References Cited

U.S. PATENT DOCUMENTS

| 5,940,376 A | 8/1999 | Yanacek |
|---|---|---|
| 6,611,955 B1 | 8/2003 | Logean |
| 6,744,739 B2 | 6/2004 | Martin |
| 6,892,227 B1 | 5/2005 | Elwell |
| 6,993,686 B1 | 1/2006 | Groenendaal |
| 7,231,555 B2 | 6/2007 | Barnard |
| 7,240,325 B2 | 7/2007 | Keller |
| 7,423,979 B2 | 9/2008 | Martin |
| 7,487,240 B2 | 2/2009 | Proulx |
| 7,529,192 B2 | 5/2009 | Labovitz |
| 7,616,579 B2 | 11/2009 | Pittelli |
| 7,636,305 B1 | 12/2009 | Taylor |
| 7,660,290 B2 | 2/2010 | Nagami |
| 7,698,396 B2 | 4/2010 | Aoyagi |

(Continued)

FOREIGN PATENT DOCUMENTS

| CN | 100388695 C | 11/2006 |
|---|---|---|
| EP | 2222025 B1 | 8/2010 |

OTHER PUBLICATIONS

Author Unknown, BGPlay @ Route Views, Apr. 14, 2015 retrieved from https://web.archive.org/web/20150414123115/http://bgplay.routeviews.org/main.html.

(Continued)

Primary Examiner — Tom Y Chang
(74) Attorney, Agent, or Firm — Van Pelt, Yi & James LLP

(57) ABSTRACT

A method and system are described. The method and system include determining a grouping characteristic for a plurality of nodes and a corresponding plurality of links. The nodes and the links correspond to components of a network and are associated with network performance information. The grouping characteristic includes at least one of partitionability into pages and a hop distance. The method and system also include generating a graphical visualization based on the grouping characteristic, the nodes and the links.

22 Claims, 11 Drawing Sheets

(56) References Cited

U.S. PATENT DOCUMENTS

| | | |
|---|---|---|
| 7,804,781 B2 | 9/2010 | Xu |
| 7,822,837 B1 | 10/2010 | Urban |
| 7,860,016 B1 | 12/2010 | Vijendra |
| 7,894,461 B2 | 2/2011 | Pei |
| 7,945,658 B1 | 5/2011 | Nucci |
| 7,975,045 B2 | 7/2011 | Underwood |
| 7,990,892 B2 | 8/2011 | Boucadair |
| 8,015,139 B2 | 9/2011 | Bahl |
| 8,130,767 B2 | 3/2012 | Aitken |
| 8,161,152 B2 | 4/2012 | Ogielski |
| 8,170,552 B2 | 5/2012 | Patel |
| 8,208,377 B2 | 6/2012 | Subramanian |
| 8,214,876 B2 | 7/2012 | Vaidyanathan |
| 8,228,815 B2 | 7/2012 | Keromytis |
| 8,254,273 B2 | 8/2012 | Kaminsky |
| 8,325,720 B2 | 12/2012 | Gao |
| 8,438,427 B2 | 5/2013 | Beck |
| 8,458,301 B1 | 6/2013 | Andrus |
| 8,484,374 B2 | 7/2013 | Zisapel |
| 8,490,055 B2 | 7/2013 | Basak |
| 8,521,904 B1 | 8/2013 | Pei |
| 8,542,612 B1 | 9/2013 | Uttaro |
| 8,549,124 B2 | 10/2013 | Duggan |
| 8,572,281 B1 | 10/2013 | Jesuraj |
| 8,751,619 B2 | 6/2014 | Tychon |
| 8,971,323 B2 | 3/2015 | Mithyantha |
| 9,014,012 B2 | 4/2015 | Jeyachandran |
| 9,411,787 B1 | 8/2016 | Lad |
| 10,042,958 B2 * | 8/2018 | Bekas ............... G06F 9/3001 |
| 2002/0120727 A1 | 8/2002 | Curley |
| 2002/0141400 A1 | 10/2002 | DeMartino |
| 2002/0199016 A1 | 12/2002 | Freedman |
| 2003/0174650 A1 | 9/2003 | Shankar |
| 2003/0236844 A1 | 12/2003 | Kaler |
| 2004/0046785 A1 | 3/2004 | Keller |
| 2004/0221296 A1 | 11/2004 | Ogielski |
| 2005/0036487 A1 | 2/2005 | Srikrishna |
| 2005/0114500 A1 | 5/2005 | Monk |
| 2005/0198269 A1 | 9/2005 | Champagne |
| 2005/0222815 A1 | 10/2005 | Tolly |
| 2005/0243729 A1 | 11/2005 | Jorgenson |
| 2006/0023638 A1 | 2/2006 | Monaco |
| 2006/0098586 A1 | 5/2006 | Farrell |
| 2006/0291446 A1 | 12/2006 | Caldwell |
| 2007/0043861 A1 | 2/2007 | Baron |
| 2007/0162595 A1 | 7/2007 | Samprathi |
| 2007/0250902 A1 | 10/2007 | Vaidyanathan |
| 2008/0049777 A1 | 2/2008 | Morrill |
| 2008/0089347 A1 | 4/2008 | Phillipi |
| 2008/0155093 A1 | 6/2008 | Dharmistan |
| 2008/0222068 A1 | 9/2008 | Bahl |
| 2008/0222287 A1 | 9/2008 | Bahl |
| 2008/0263188 A1 | 10/2008 | Awduche |
| 2009/0055522 A1 | 2/2009 | Shen |
| 2009/0161556 A1 | 6/2009 | Qian |
| 2009/0204795 A1 | 8/2009 | Nasuto |
| 2009/0276771 A1 | 11/2009 | Nickolov |
| 2010/0002578 A1 | 1/2010 | Fiorone |
| 2010/0080129 A1 | 4/2010 | Strahan |
| 2010/0100627 A1 | 4/2010 | Evans |
| 2010/0118714 A1 | 5/2010 | Labovitz |
| 2010/0132039 A1 | 5/2010 | Ji |
| 2011/0145434 A1 | 6/2011 | Ringen |
| 2011/0286418 A1 | 11/2011 | Liu |
| 2012/0017165 A1 | 1/2012 | Gardner |
| 2012/0151041 A1 | 6/2012 | Gerber |
| 2012/0191826 A1 | 7/2012 | Gotesdyner |
| 2012/0207161 A1 | 8/2012 | Uppalli |
| 2012/0239799 A1 | 9/2012 | Wang |
| 2013/0311832 A1 | 11/2013 | Lad |
| 2014/0029443 A1 | 1/2014 | Bhavanam |
| 2014/0181292 A1 | 6/2014 | Venkataswami |
| 2014/0280917 A1 | 9/2014 | Lad |
| 2014/0304407 A1 | 10/2014 | Moon |
| 2014/0344926 A1 | 11/2014 | Cunningham |
| 2014/0351564 A1 * | 11/2014 | Bekas ............... G06F 9/3001 712/222 |
| 2017/0353243 A1 * | 12/2017 | Brueckheimer ....... H04B 10/27 |
| 2018/0121032 A1 * | 5/2018 | Naous ............... G06F 3/0482 |
| 2018/0322219 A1 * | 11/2018 | Bekas ............... G06F 9/3001 |

OTHER PUBLICATIONS

Author Unknown, Bgplay.js, What is BGPlay.js? Printed on Apr. 7, 2015.
Author Unknown, RIPE Network Coordination Centre, printed on Apr. 7, 2015.
Author Unknown, Route View 6447, Route Views Project Page, University of Oregon Route Views Project, Jan. 27, 2005.
Author Unknown, Routing Information Service (RIS), Oct. 7, 2013.
Blunk et al., Multi-Threaded Routing Toolkit (MRT) Routing Information Export Format, Oct. 2011.
Lougheed et al., A Border Gateway Protocol (BGP), Jun. 1989.
Rekhter et al., A Border Gateway Protocol 4 (BGP-4), Jan. 2006.
Vazquez et al., Internet Topology at the Router and Autonomous System Level, 2002.

* cited by examiner

NETWORK PATH VISUALIZATION USING NODE GROUPING AND PAGINATION

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

BRIEF DESCRIPTION OF THE DRAWINGS

Various embodiments of the invention are disclosed in the following detailed description and the accompanying drawings.

DETAILED DESCRIPTION

Figure 1A:
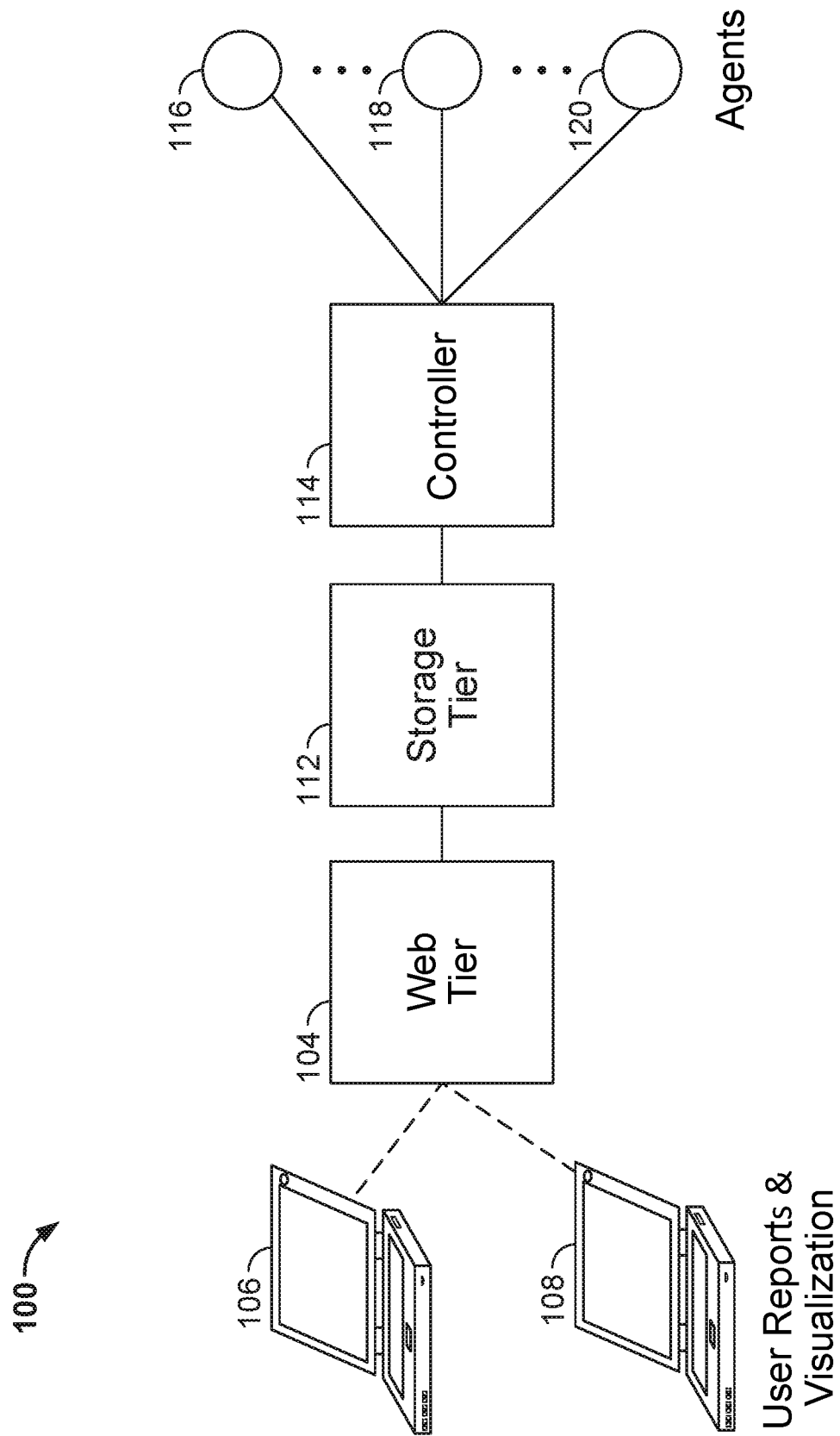
FIGS. 1A-1B are an exemplary embodiment of a platform architecture for performing monitoring and graphical visualization of performance data for a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems.

What are needed are new and improved techniques to visualize and troubleshoot the performance of cloud-based/web-based services (e.g., distributed applications and SaaS-based solutions available as web services via web sites and/or using other cloud-based implementations of distributed applications) to, for example, facilitate detection of various networking related performance problems and determining the locations and/or root causes of such networking related performance problems.

Various techniques for monitoring networks exist. Such mechanisms provide performance data related to the network, such as congestion, latency, Internet paths and packet loss. Interpreting and utilizing network performance data using an embodiment described herein includes a graphical visualization of the topology of the network. The network topology includes components of the network (such as routers, switches, carrier services, interfaces, Internet connectivity services, security devices such as firewalls, end-user devices, data center and cloud resources) and how such network components are connected together. The network topology may be represented by nodes and links connecting the nodes. The device(s) represented by a node depend upon the granularity with which the topology is shown in the graphical visualization. At one level of granularity, a node may represent a single network component, such as a network interface having an IP address, a prefix, a location and analogous information. At another level of granularity, a node may represent a collection of devices, such as a top private domain. A link represents the presence of traffic between two nodes. Thus, the network topology can be represented by nodes and links. A path is a route traversed through a network. The path is a sequence of nodes and links. For example, a path may represent the sequence of routers traversed by certain packets or the sequence of autonomous system (AS Path) announced by a router running BGP for a given prefix. In a path, the first node of the sequence is the source or agent, while the last node is the target, or destination. The links between the nodes in the path are also known as hops.

A method and system for visualizing network performance are described. The method and system include determining a grouping characteristic for a plurality of nodes and a plurality of links. The nodes and the links correspond to components of a network and have associated performance information. The grouping characteristic includes at least one of partitionability into pages and a hop distance. The method also includes generating a graphical visualization based on the grouping characteristic, the nodes and the links.

Figure 1B:
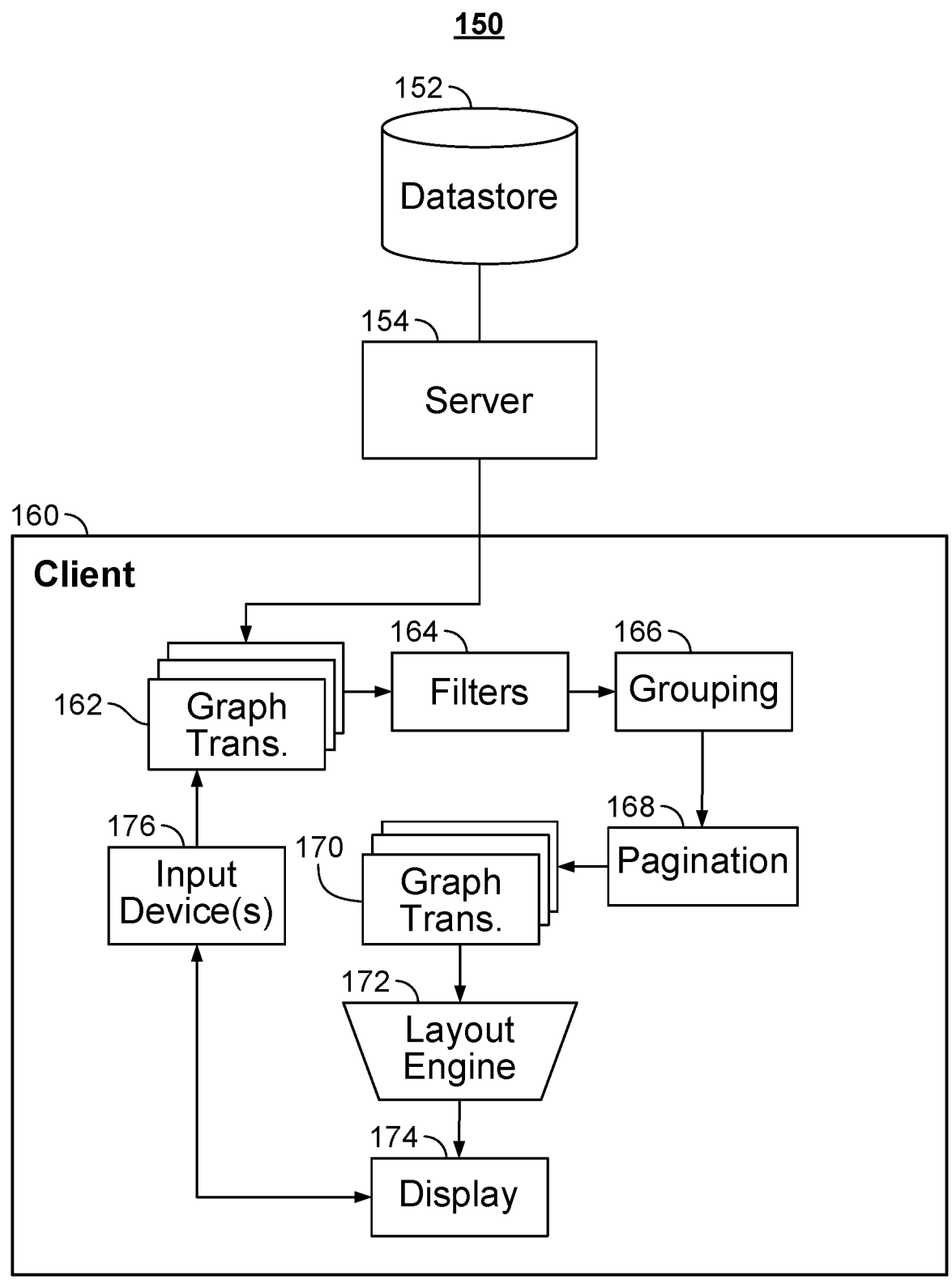

FIGS. 1A-1B depict an exemplary embodiment of a system for monitoring and visualizing network performance. FIG. 1A depicts an exemplary embodiment of a platform architecture for performing monitoring and graphical visualization of performance data for networks. FIG. 1A illustrates an environment in which a system 100 for obtaining network layer and device layer information, as well as for visualizing this information, operates. The system 100 includes agents 116-120 (e.g., cloud and/or enterprise agents, which can be configured to perform certain tests, have labels, and/or perform on demand, event/context triggered, and/or scheduled tests, such as similarly described herein) that collect data based on configured tests, and the agents 116-120 send this data to controller(s) 114 (e.g., agent controller(s)). Controller 114 stores the data in a storage tier 112 (e.g., providing permanent storage) that can be used by a web tier 104 to generate visualizations, alerts, and/or reports to users accessing platform 100 using client/endpoint devices 106 and 108 (e.g., computers, laptops, smartphones, and/or various other computing devices), such as various visualizations, alerts, and/or reports as similarly described above.

In various embodiments, platform 100 is a scalable, elastic architecture and may comprise several distributed components, including components provided by one or more third parties. Further, when platform 100 is referred to as performing a task, such as storing data or processing data, it is to be understood that a sub-component or multiple sub-components of platform 100 (whether individually or in cooperation with third party components) may cooperate to perform that task.

FIG. 1B is an exemplary embodiment of a system 150 for visualizing performance data for networks. For clarity, only certain components are illustrated. Other and/or additional components are utilized. System 150 includes datastore 152, server 154 and client 160. Datastore 152 stores network performance data obtained as described above and may be analogous to storage tier 112 depicted in FIG. 1A. Server 154 provides performance data from datastore 152 to client 160 and may be analogous to web tier 104 depicted in FIG. 4. Graphical transformations components 162 and 170, filters component 164, grouping component 166, pagination component 168 and layout engine 172 are indicated as being part of client 160. However, one or more of the components 162, 164, 166, 168, 170 and 172 may be downloaded from or resident in server 154. Display 174 and input device(s) 176 are used to provide the graphical visualization to the user and receive inputs from the user, respectively. For example, input device(s) 176 may be used to select portions of the graphical visualization rendered on display 174 for updating, filtering, grouping and/or pagination as discussed below. Graphical transformation blocks 162 and 170 apply techniques to make the graph more compact and/or assist the user in more easily reading the graph. For example, graphical transformation blocks 162 and 170 may collapse links to reduce the number of visible hops and provide an indication that the link has been collapsed and/or may set the color of nodes in the same network to be the same color to assist in identifying the boundaries of a network. Operation of components 164, 166, and 168 are described below with respect to the generation and updating of graphical visualizations. Filters component 164, grouping component 166, pagination component 168 in particular are described.

Figure 2:
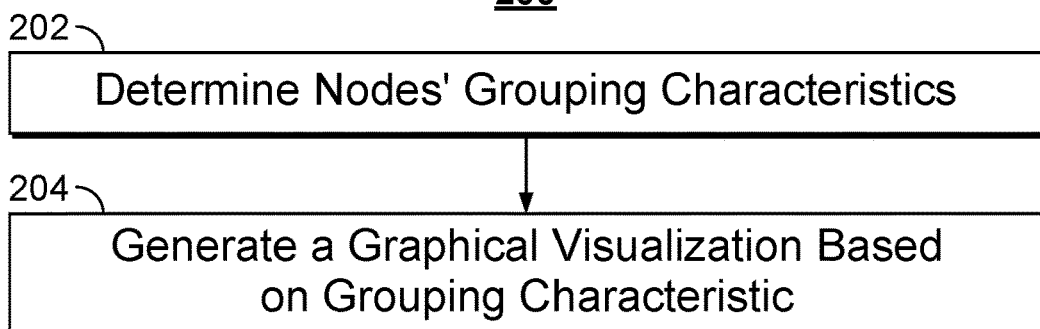
FIG. 2 is a flow chart depicting an exemplary embodiment of a method for providing a graphical visualization of performance data for a network based on grouping characteristics.

FIG. 2 depicts an embodiment of method 200 for providing a graphical visualization of network performance data based on grouping characteristic. For simplicity, only some steps may be depicted. Further, substeps, other steps and/or additional steps may be used. Method 200 is described in the context of systems 100 and 150. However, method 200 may be used in conjunction with other systems. Method 200 starts after some or all of the data to be used in generating the graphic visualization is available for processing. Method 200 may commence after another graphic visualization has been rendered on display. In such a case, method 200 is used to update the graphic visualization. Method 200 may operate on network performance data stored in storage tier 112/ datastore 152 and may be carried out using web tier 104 and systems 106 and 108/server 154 and client 160.

Grouping characteristics for nodes and the corresponding links are determined, at 202. The nodes and links correspond to components of a network and have associated network performance information. As discussed above, the nodes may represent network components such as devices routers, switches, or a collection of such devices, while a link represents the presence of traffic between two nodes. The grouping characteristic includes at least one of partitionability into pages and a hop distance. Hop distance is a number of hops (links) in a path from a specified node, such as the target (destination) node. Use of hop distances may allow loops in graphical visualizations to be disambiguated. Partitionability into pages relates to the ability of nodes, links and the paths between sources and destinations to be divided into separate pages. For example, nodes and links may be part of a particular number, intertwining or complexity of paths between sources and destinations for a dataset of network performance data. Based on these features, the paths and thus the network performance data may be partitioned into multiple separate pages. This may improve a user's ability to view, understand and interpret the network data.

In addition to one or both of partitionability and hop distance, additional grouping characteristics might be determined at 202. For example, nodes may be divided into group types, such as source, destination or interface (intermediary) nodes. These nodes may be further grouped based on grouping properties. Agents (sources) may include one or more of agent identification, location, network, and a combination of network and location. Grouping properties for destinations might include IP address, network, location, a combination of network and location. Grouping properties for interfaces might include IP address, network, location, network and location. The grouping properties and group types may be considered examples of the grouping characteristics determined at 202.

Graphical visualizations are generated based on the grouping characteristic(s), as well as the nodes and links, at 204. These visualizations may be provided to display 174 for a user to view and interact with. The grouping characteristics may be used to collapse, simplify, drill down to a higher level of granularity or otherwise improve the clarity of graphical visualizations of the network performance data for the nodes and links. For example, sets of nodes, the links connecting the nodes and the paths so formed may be broken into multiple pages so that a user may view information for portions of the network. Similarly, nodes at the same geographic location may be grouped together and represented by a single group node in lieu of multiple group nodes. Loops arising in such graphical visualizations may be disambiguated using hop distance. Further, particular portions of the graph may be filtered based on the grouping characteristics. For example, only paths having a particular source may be shown in the graphical visualization.

Thus, characteristics of components of the network may be used in providing graphical visualizations of network data. Such visualizations may be better organized or more easily understood. Users may be better able to understand, interpret, and interact with network performance data, as well as to address issues in network performance.

Figure 3:
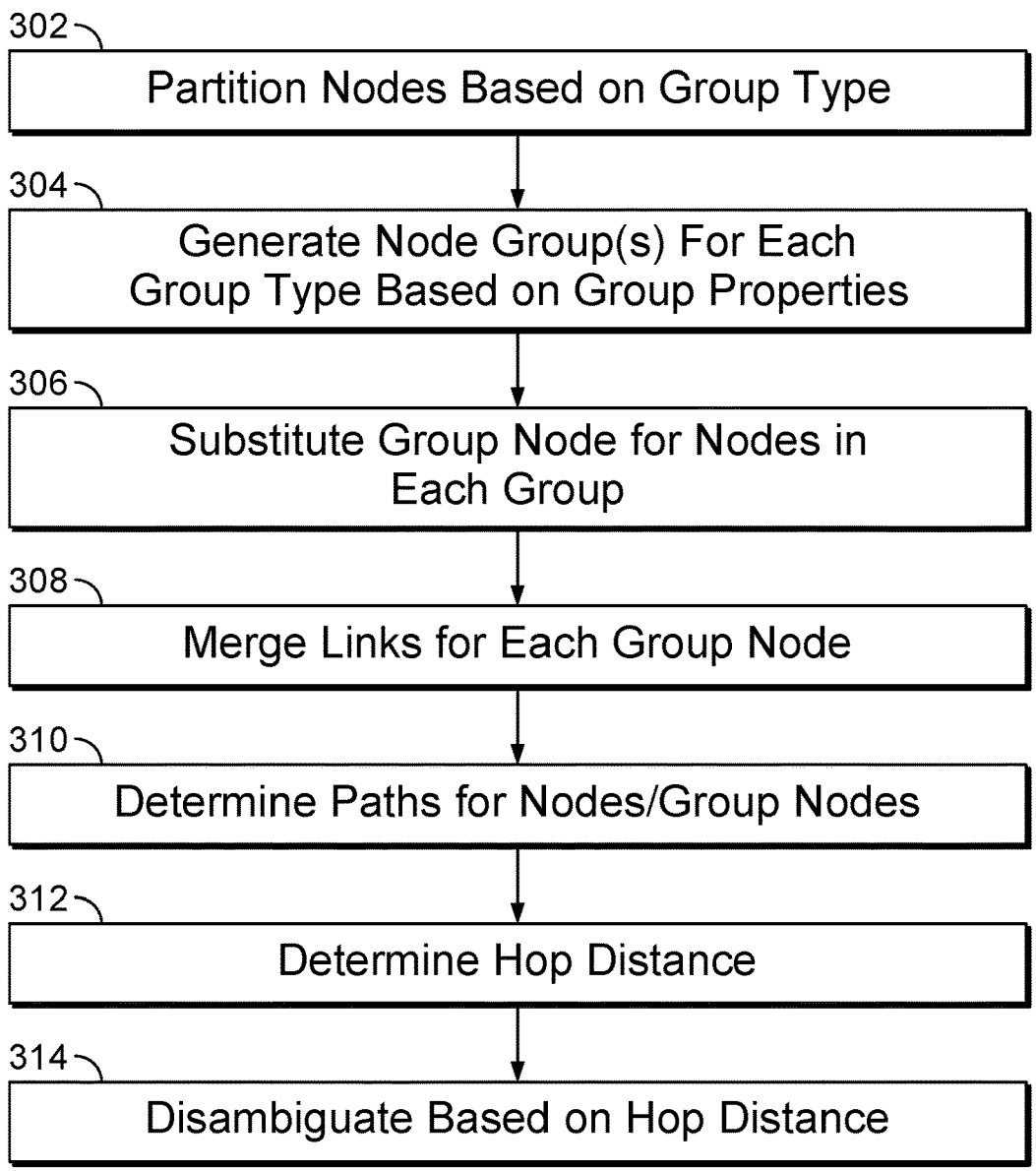
FIG. 3 is a flow chart depicting an exemplary embodiment of a method for providing a graphical visualization of performance data for a network based on hop distance.

FIG. 3 is a flow chart depicting an exemplary embodiment of method 300 for providing a graphical visualization of performance data for a network based on hop distance. For simplicity, only some steps may be depicted. Further, substeps, other steps and/or additional steps may be used. Method 300 may commence after another graphic visualization has been rendered on display. In such a case, method 300 is used to update the graphic visualization. The method 300 is used in which the hop distance is determined to be one of the grouping characteristics in 202 and may utilize grouping component 166 in providing the graphical visualization.

The nodes that are displayable in the graphical visualization are partitioned, or classified, based on group type, at 302. In one embodiment, the group types may be source, destination or interface (intermediary). Thus, nodes at which traffic originates have a source type. Nodes at which traffic terminates have a destination type. Nodes and links between the source node and destination node have the interface, or intermediary, type. Thus, for a particular graphical visualization, up to three group types (or three partitions) are possible in such an embodiment. Nodes within a particular partition, or classification, may be grouped together. Thus, each group type may be further split into groups based on grouping properties, at 304. Group properties for sources may include one or more of agent identification, location, network, and a combination of network and location. Group properties for destinations might include IP address, network, location, a combination of network and location. Group properties for interfaces might include IP address, network and location. Thus, within each type, multiple groups based on properties are possible. For example, a user may select location as the group property for sources. The source nodes may then be split into groups based on the location of each source node.

For each group within each type, a group node is substituted for the nodes, at 306. Stated differently, the nodes may be merged into a single group node for each group within each type. In the example above, a single group node for a particular location replaces the sources node(s) at that location. Links between two or more nodes within the same group become hidden.

The remaining links to the group node(s) are merged to form one or more merged links, at 306. If there are multiple links from a particular node (or particular other group node) to nodes represented by a group node, these links are merged to form a single merged link from the particular node/particular other group node to the group node substituted at 304. Thus, these links terminate at the group node. However, links from different nodes/group nodes are not merged, remaining separate after 306. A graphical visualization after 306 would include group nodes, merged links, any remaining nodes and any remaining links. As a result, the graphical visualization of the network performance data can be made more compact and simplified. In some cases, such a visualization could include loops in paths ("looped paths"). Consequently, the grouping characteristic described above, hop distance, may be used to remove loops in looped paths.

The paths for remaining, group nodes, links and merged links are determined, at 310. The hop distance for the nodes and group nodes is determined at 312. The hop distance for a particular node in a path is the number of links from a specified node to a particular node. In some embodiments, the specified node is the destination. In such embodiments, the hop distance is the number of hops (links/merged links) from the destination to the specified node/group node. Any loops in a looped path may be disambiguated based on the hop distance of the node/group node, at 314.

Figure 4A:
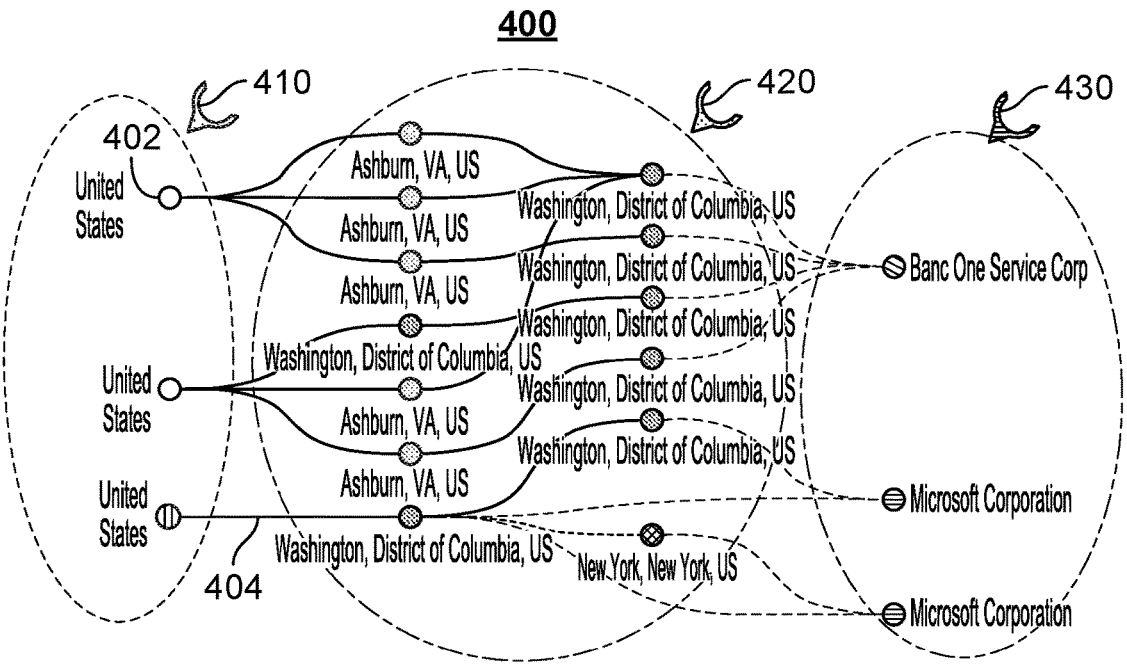
FIGS. 4A-4D are exemplary embodiments of graphical visualizations of network performance data based on grouping and hop distance.

FIGS. 4A-4D are exemplary embodiments of graphical visualizations 400, 400A, 450 and 450A of network performance data based on grouping and hop distance. Visualizations 400, 400A, 450 and 450B thus represent the state of a network as well as paths through the network. Referring to FIG. 4A, graphical visualization includes nodes and links. Nodes are indicated by circles. Links are indicated by (solid or dotted) lines. For simplicity, only node 402 and link 404 are labeled. In the embodiment shown, three group types 410, 420 and 430 have been determined at 302. Each group type corresponds to a partition formed at 302. These group types are source 410, interface (intermediary) 420 and destination 430.

Graphical visualization is desired to be compacted based upon group properties within a group type. For example, multiple sources may be grouped based upon a particular group property such as location, multiple interfaces may be grouped based on a group property such as network, and/or multiple destinations may be grouped based upon a group property such as IP address. In the embodiment shown in FIGS. 4A-4B, location has been selected as the group property for sources, location has been selected as the group property for interfaces, and upon network has been selected as the group property for destinations. Thus, nodes 402 in source type 410 and interface type 420 are further grouped at 304 based upon geographic location. Nodes 402 in destination type 430 are grouped based upon their network also at 304. As can be seen in FIG. 4A, all nodes 402 in source type 410 are within the United States and thus are considered to share a single group property. Nodes 402 in interface type 420 are in various cities.

Consequently, the nodes 402 of the interface type 420 have different group properties. Nodes 402 having destination type 430 are part of two networks. Consequently, two nodes 402 having destination type 430 are in the same group, while another is in a separate group. Thus, a group node replaces the nodes 402 in group 410, three group nodes (for the 3 different cities) replace the nodes 402 in interface type 420 and two group nodes replace the three nodes 402 in destination type 430, at 306. Links 404 to individual nodes are merged to form merged links, at 308.

Figure 4B:
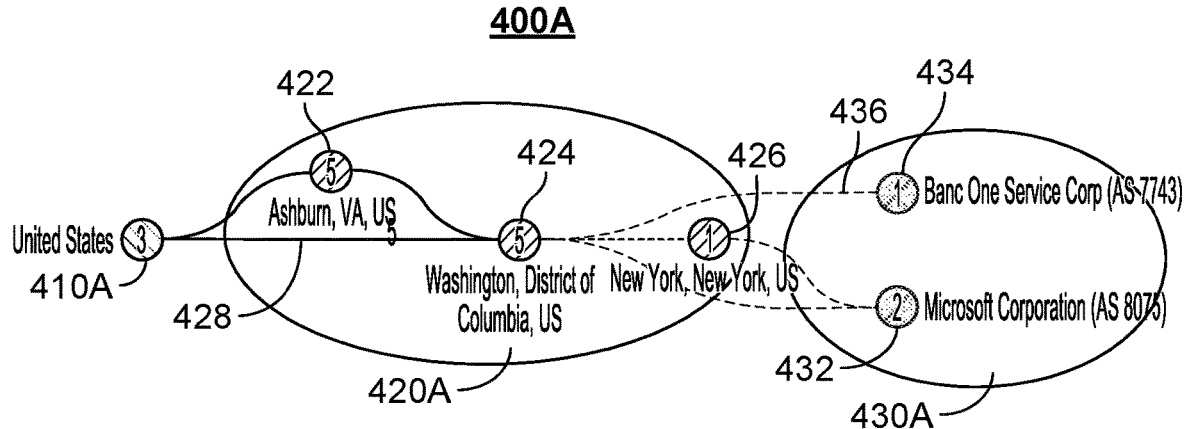

FIG. 4B depicts a graphical visualization 400A of the performance data that would result after step 308 is completed for the performance data of graphical visualization 400. Nodes 402 of source type 410 have been merged to a single group node 410A because of the shared location group property. Group type 420A, which corresponds to interface type 420, includes group nodes 422, 424 and 426 for different locations. Group type 430A (destinations) includes a group node 432 for one network and a node 434 that had previously been present and corresponds to a different network. Links have been merged to form merged links such as merged links 428 and 436.

As can be seen by a comparison of FIGS. 4A and 4B, partitioning into type and separating nodes within one or more types into groups based on group properties has significantly compacted and simplified graphical visualization 400A as compared to visualization 400. Consequently, the user may be better able to understand and utilize graphical visualization 400A to monitor and improve network performance.

Figure 4C:
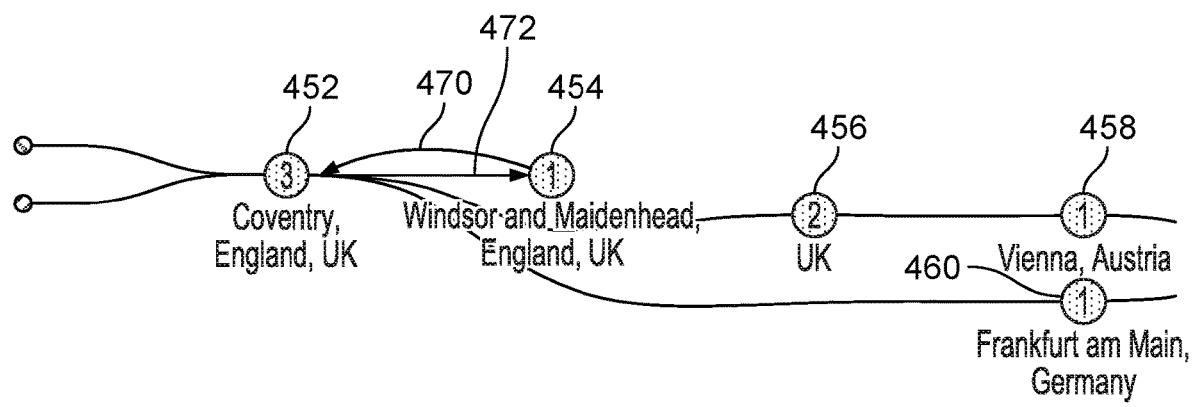

FIG. 4C includes graphical visualization 450 that illustrates issues that might arise due to grouping using 302 through 308 of method 300. As can be seen in FIG. 4C, graphical visualization 450 includes group nodes 452, 454, 456, 458 and 460, each of which has a different location (group property), though they may all share the same group type, such as being interfaces. Two merged links 470 and 472 exist between group nodes 452 and 454. Thus, a loop exists in graphical visualization 450. Loops may occur when the groups are formed using a coarse-grained property such as location. This may be due to the location information for some interfaces not being of sufficiently fine granularity or the path actually going through one location (group node 452), going through at least one other location (group node 454) then back through location the first location (group node 452). Thus, it may be desirable to disambiguate the loop.

Figure 4D:
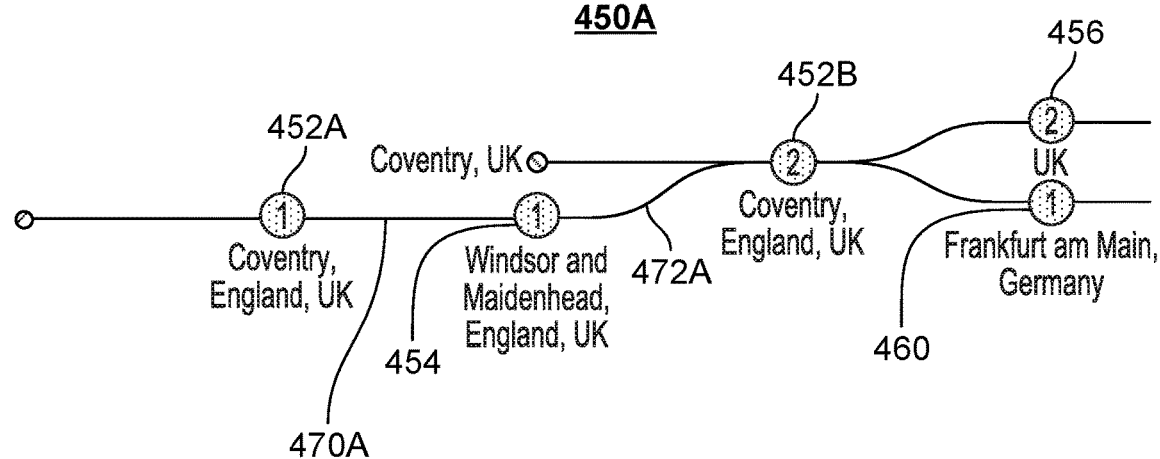

At 310, the paths for visualization 450 are determined. The hop distances for the nodes are determined at 312 and the loop disambiguated based on hop distance at 314. The resulting visualization 450A is shown in FIG. 4D. Links 470A and 472A replace links 470 and 472. Based because they have different hop distances (e.g. different hop distances from a destination), nodes 452A and 452B have replaced group node 452. Thus, visualization 450A has no loops.

Figure 5:
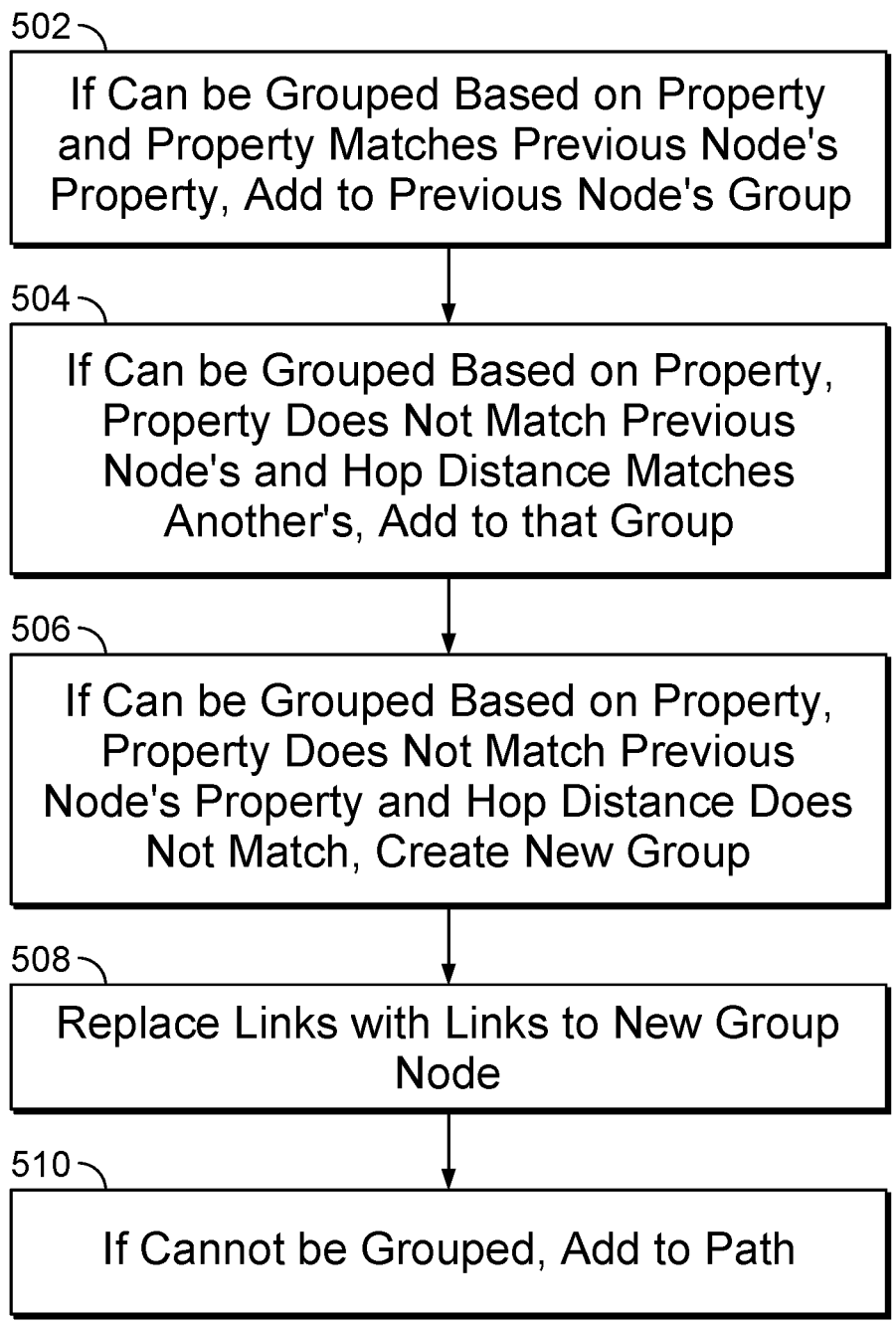
FIG. 5 is flow chart depicting an exemplary embodiment of a method for disambiguating loops based on hop distance for graphical visualizations of network performance data.

FIG. 5 depicts an exemplary embodiment of method 500 for disambiguating loops using hop distance. Method 500 is described in the context of visualizations 450 and 450A. Method 500 uses group property and hop distance to disambiguate loops. Method 500 may be performed for each node in each path and may utilize component 166 of system 150.

For each node in a path, if the node can be grouped based on its group property and its group property matches the property of the previous/adjacent node, the node is added to the group of the previous node, at 502. This does not result in loops because adjacent nodes having the same group property, such as location, are part of the same group and can be represented by a single group node without a loop being formed.

For each node in the path, if the node can be grouped based on its group property, its group property does not match the group property of the previous node, and the hop distance matches that of another node, the node is added to that group of the other node, at 504. For each node in the path, if the node can be grouped based on its group property, its group property does not match the group property of the previous node, and the hop distance does not match that of another node, then a new group for that node is created, at 506. The links are merged to the nodes/group nodes formed in 502, 504 or 506, at 508. If the node cannot be grouped based on its group property, for example because the group property for the node (e.g. the location) is unavailable, then the node is simply added to the path at 510.

In some embodiments, method 500 may be performed using two keys. Thus, a property key may be formed using the group property and a hop distance key may be formed by combining the hop distance and group property for each node. If the property key of a node matches that of the previous node, then at 502 the node is placed in the same group as the previous node. The group node replaces these nodes. If a node has a different property key from another node but the hop distance keys match, then the node is added to the group of the other node at 504. If a node has a different property key from another node and a different hop distance key from the other nodes, then a new group is created for the at 506. The links can be replaced at 508.

For example, in the visualization 450 a loop is formed by group nodes 452 and 454 and links 470 and 472. To address this, visualization 450A is formed using method 500. As discussed above, hop distance is a distance from the destination. Thus, node 452B has a different (smaller) hop distance than node 452A. Node 452B has a different location (group property) than node 456 and 460. Node 452B thus may be is placed in a new group at 506. The location for group node 454 (Windsor and Manchester) does not match that the location of previous node 452B (Coventry). The nodes 454 and 452B are also at different hop distances. At 506, node 454 is placed in a new group. Link 472A between nodes 454 and 452B may be formed at 508. Node 452A has a different location than previous node 454. Thus, 502 is not used to place nodes 470A and 454 in the same group. Although node 452A has the same location (group property) as node 470B, the hop distances differ. Thus, at 506 node 452A is placed in a new group. Link 470A is formed at 508. Consequently, the loop in visualization 450 is disambiguated in visualization 450A.

Thus, visualization 450A is compacted and simplified by the formation of groups. In addition, loops have been removed, allowing paths to be more readily read from left to right across visualization 450A. A user's ability to understand network behavior is, therefore, improved.

Figure 6:
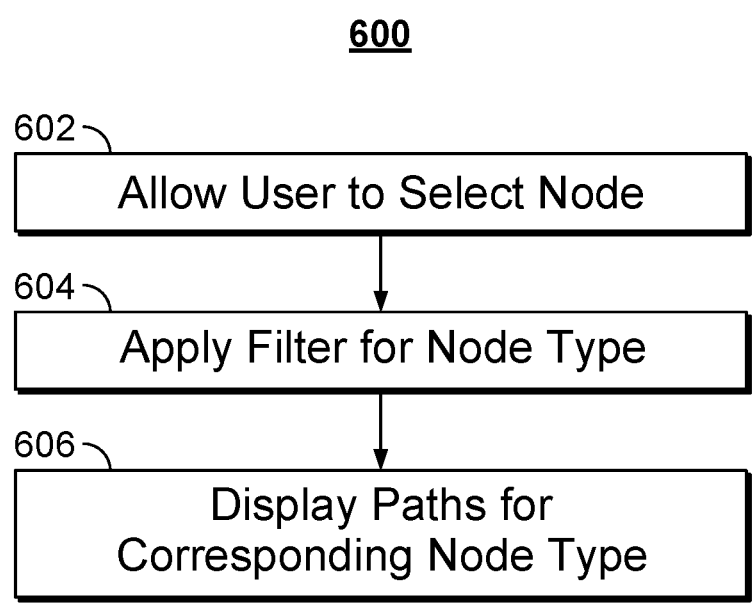
FIG. 6 is a flow chart depicting an exemplary embodiment of a method for providing graphical visualizations of network performance data incorporating filters.

FIG. 6 is a flow chart depicting an exemplary embodiment of method 600 for providing a graphical visualization of performance data for a network that incorporates filters. For simplicity, only some steps may be depicted. Further, substeps, other steps and/or additional steps may be used. Method 600 may be combined with other methods including but not limited to methods 200, 300, 500 and/or 800. Method 600 may also be carried out utilizing component 164 of system 150.

Selection(s) for filter(s) are received, at 602. The filter(s) relate to group types and/or group properties of nodes. In one embodiment, the user may select a source node, destination node, interface node, or group of nodes of a visualization. Further, the user may select multiple filters and multiple nodes.

The selected filter(s) are applied for the selected node(s), at 604. For example, if a user selects a particular node, then a filter is applied such that only links and nodes/group nodes having paths through the particular node are shown. Other links and nodes and/or group nodes not connected with the selected node are removed via 604. For example, a first filter may be selected for source nodes having a particular location. A second filter may be for a target network. The filter for the source location and target network may thus be applied. Paths including both source nodes having the selected location and target (destination) nodes having the selected network are part of the information to be displayed. Other nodes and links not part of these paths may be removed.

The filtered information is displayed, at 606. Thus, the graphical visualization has been filtered to show only those items associated with the user selection. In some embodiments, for those items that are to be shown are depicted with finer granularity.

Figure 7A:
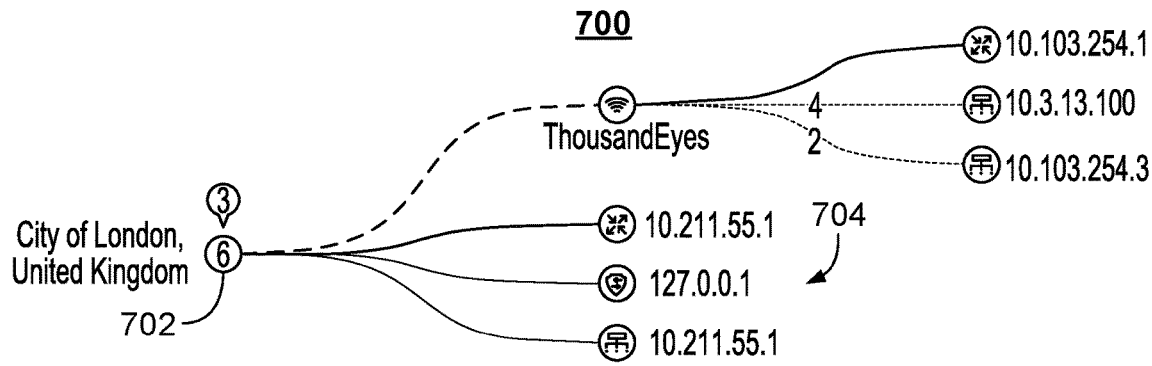
FIGS. 7A-7C are exemplary embodiments of graphical visualizations of network performance data incorporating filtering.
Figure 7B:
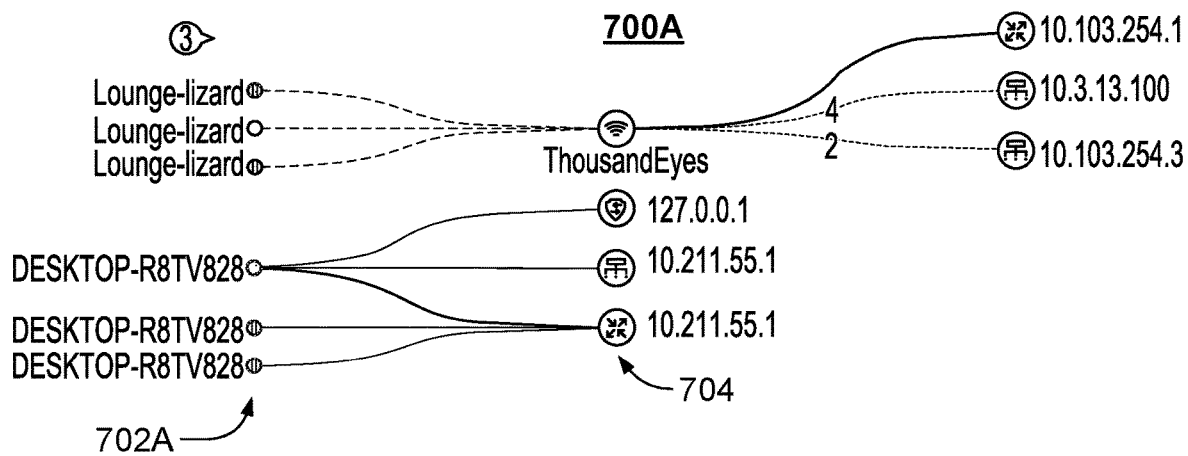
Figure 7C:
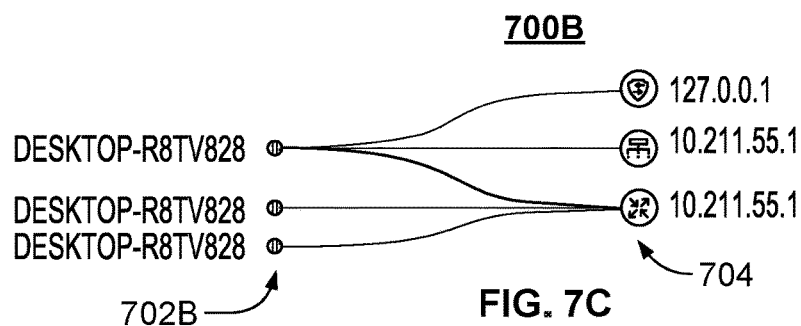

For example, FIGS. 7A-7C are exemplary embodiments of graphical visualizations 700 and 700A of network performance data incorporating filters and grouping. Referring to FIG. 7A, graphical visualization 700 includes group node 702 for which more information is desired to be viewed. Group node 702 is a group agent node. Thus, the agents in visualization 700 are grouped by agent location. Also indicated are destination nodes 704.

FIG. 7B depicts a visualization 700A after the grouping has been changed from grouping the agents by location to grouping the agents by agent (e.g. no grouping). Multiple nodes 702A are depicted in place of group node 702. Nodes 702A and links from nodes 702A are shown in greater detail. Additional links and nodes are shown in 700A because the grouping has changed from grouping agents by location to grouping by agents by agent. In this case, grouping sources by agent is substantially the same as not applying grouping. A filter is desired for nodes 704. At 602, a filter for destinations 704 is selected. Thus, graphical visualization 700A is filtered for particular destination nodes. The paths for the destination nodes 704 are determined and links/nodes not part of these paths removed at 604. A graphical visualization may be generated from the resulting information.

FIG. 7C depicts a visualization 700B after the destination filter has been applied at 604 and graphical visualization 700B formed at 606. Thus, links and nodes not part of the paths between source nodes 702B and destination nodes 704 are removed. Thus, application of filters allows for the graphical visualization to be drilled down for greater detail in selected areas. Thus, a user's ability to investigate portions of network performance data is improved.

Figure 8:
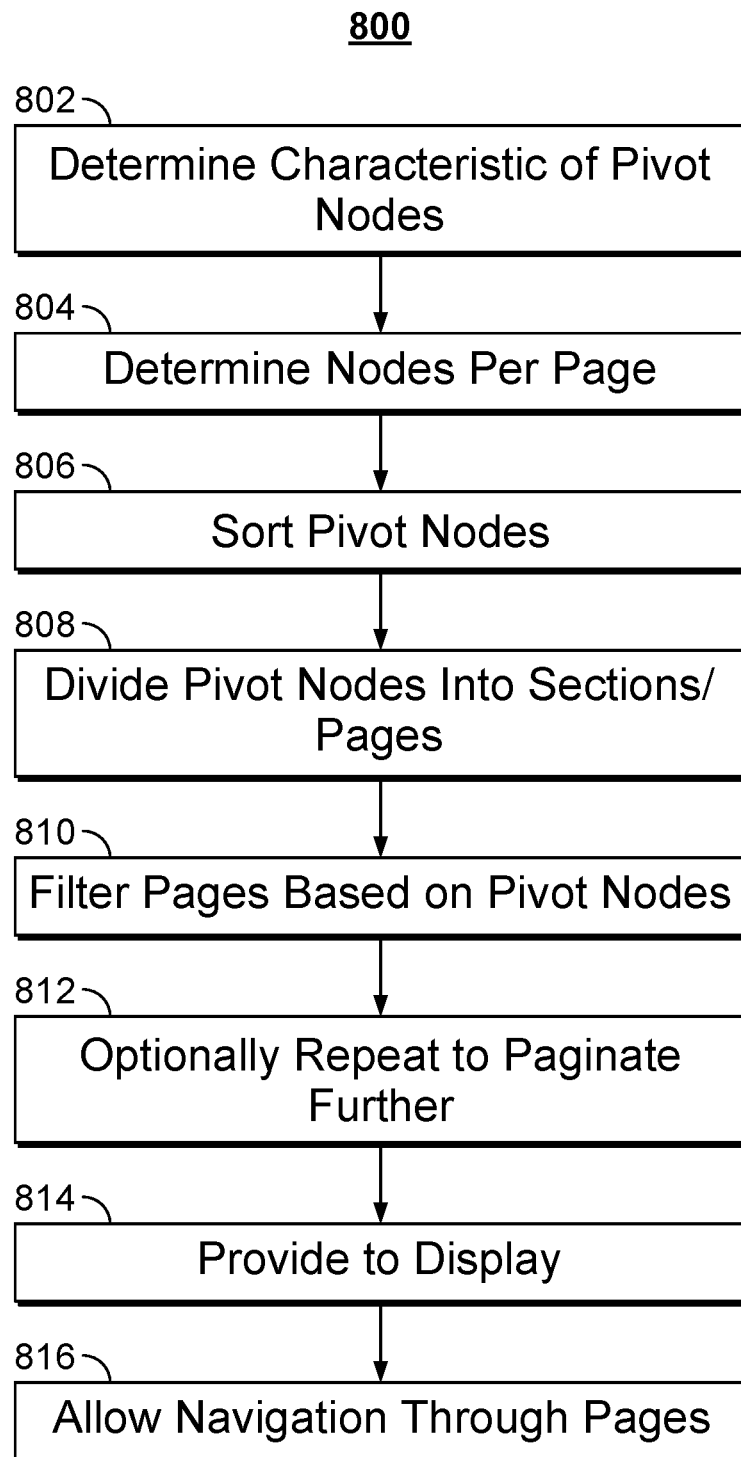
FIG. 8 is a flow chart depicting an exemplary embodiment of a method for providing graphical visualizations of network performance data incorporating pagination as a grouping characteristic.

FIG. 8 is a flow chart depicting an exemplary embodiment of method 800 for providing a graphical visualization of network performance data including pagination. Thus, the method generates graphical visualizations based upon the grouping characteristic partitionability into pages. For simplicity, only some steps may be depicted. Further, substeps, other steps and/or additional steps may be used. Method 800 may commence after another graphic visualization has been rendered on display. In such a case, the method 800 is used to update the graphic visualization. The method 800 is used in which partitionability into pages is determined to be one of the grouping characteristics in 202. In carrying out method 800, component 168 of system 150 may be utilized.

The characteristics of pivot nodes are determined, at 802. Pivot nodes are those which can be used to partition network performance data into pages. For example, it could be the topology of paths, the distribution of paths or other features of the data that allow the visualization to be divided into sections. For example, the characteristics of the pivot nodes allow the performance data to be divided into pages such that all paths through the nodes on the page are able to be shown within the page.

A number of pivot nodes per page is determined at 804. This number may be fixed or dynamic. If the number of pivot nodes is dynamic, then a maximum number of nodes (both pivot nodes and other nodes) per page may be set. For example, it may be determined at 804 that each page includes at most two pivot nodes (fixed) or that each page includes not more than twenty generic nodes (dynamic). The number of nodes per page (both in the static and in the dynamic approach) may be set such that each page includes few enough nodes to be better viewed, but that a set of performance data is broken into a sufficiently small number of pages. By using a fixed (or static) page sizing, the resulting nodes in a single page can be arbitrary, depending on the nature of the graph. This occurs because for a limitation only on the number of pivot nodes per page, the total number of nodes in a single page depends on the number of paths passing through each pivot nodes, as well as the number of hops in each of these paths. By using a dynamic page sizing, the paths and the hops passing through each pivot node are taken into account, so the total number of nodes in a page may be limited. The pivot nodes are sorted based on one or more criteria, at 806. For example, if the pivot nodes may be sorted by packet loss or average latency. As a result, nodes having a highest packet loss or highest average latency appear on the first page. Thus, nodes having the highest errors may be shown to a user first. In another example, if pivot nodes are part of a group node, then the number of pivot nodes per group ("pivot node group number") can be used as a sort criterion. Groups with the highest (or lowest) pivot node group number may appear on the first page. Thus, more (least) populous groups may be shown to a user first. Other criteria can be used. The sort criteria used at 806 may be selected such that the performance data in which the user is most interested appears earlier in the pages.

The nodes (including group nodes and pivot nodes) are divided into sections, where each section includes the nodes for a page, at 808. The nodes are divided such that each page includes the appropriate number of pivot nodes based on the selection at 804 as well as any remaining nodes associated with the pivot nodes.

The paths in the data are filtered based on the division of the pivot nodes, at 810. Data for each page is filtered for nodes/pivot nodes on the page such that only paths through these pivot nodes, and the links in the path, are shown. Thus, only data for the page will be displayed on the page.

Steps 802 through 810 may be repeated to paginate the data further, at 812. Thus, performance data may be further broken down to facilitate visualization.

The performance data for a page, including the pivot nodes, links and other nodes for each section determined at 808-810 are displayed at 814. In addition, navigation tool(s) are displayed at 814. Navigation tools allow a user to navigate to other page(s) of data. For example, buttons for next or previous pages may be included as part of the display. In some embodiments, a fictitious node representing the next page and/or a fictitious node representing the previous page may be provided for user selection. The user may then be allowed to navigate through the pages by selecting the navigation tools, at 816. Thus, the pages may be alternately rendered on display 174 for the user to view.

Figure 9A:
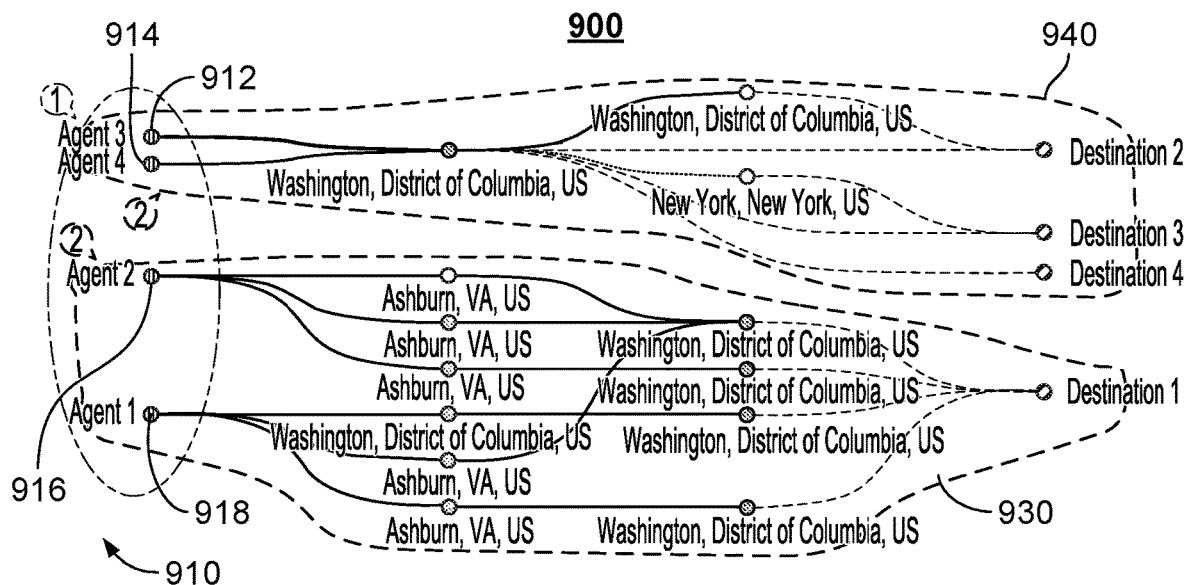
FIGS. 9A-9E are exemplary embodiments of graphical visualizations of network performance data incorporating pagination.

FIGS. 9A-9E depicts exemplary embodiments of graphical visualizations provided based on the grouping characteristic of partitionability into pages. FIG. 9A depicts a graphical visualization 900 that is desired to be split into pages. The nodes having a source group type 910 include nodes 912, 914, 916 and 918. These source nodes 910 are used as pivot nodes. As indicated in graphical visualization 900, the pivot nodes 912, 914, 916 and 918 can be divided into two pivot nodes per page. The pivot nodes are also shown as sorted such that nodes 912 and 914 are part of one section/page 940 while pivot nodes 916 and 918 are part of another section/page 930. Section 930 includes not only pivot nodes 916 and 918, but also the links and remaining nodes forming paths through pivot nodes 916 and 918. Similarly, section 940 includes not only pivot nodes 912 and 914, but also the links and remaining nodes forming paths through pivot nodes 912 and 914.

Figure 9B:
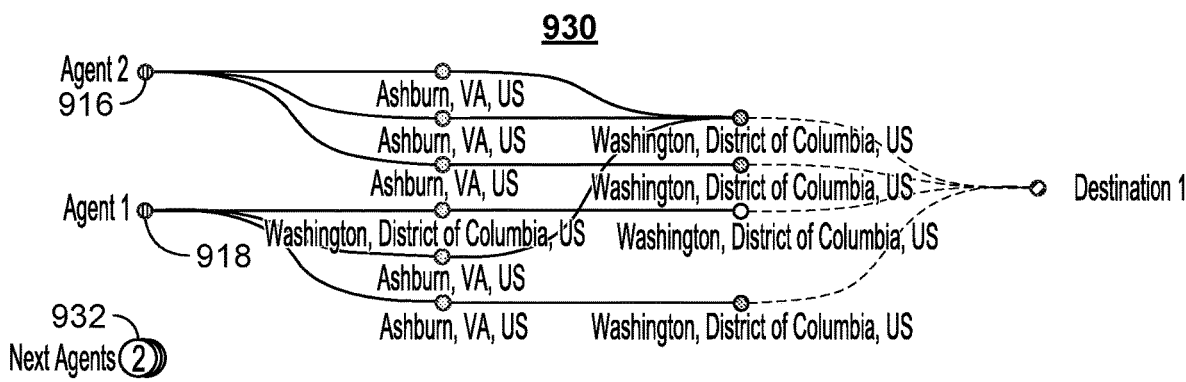
Figure 9C:
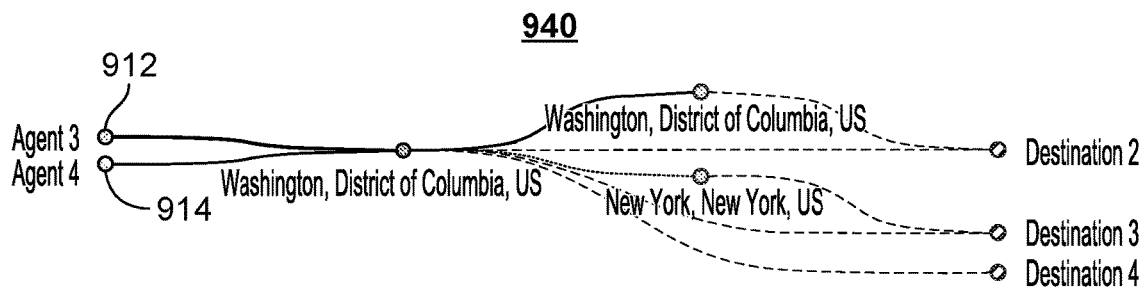

The data are filtered at 810 such that the corresponding paths through the pivot nodes are shown on each page. FIG. 9B depicts a graphical visualization of page 930 including pivot nodes 916 and 918. Because of the filtering, only pivot nodes 916 and 918, remaining links and remaining nodes forming paths through 916 and 918 are shown. Also depicted is navigation tool 932. Similarly, FIG. 9C depicts a graphical visualization of page 940 including pivot nodes 912 and 914. Because of the filtering, only pivot nodes 912 and 914, remaining links and remaining nodes forming paths through 916 and 918 are shown.

Figure 9D:
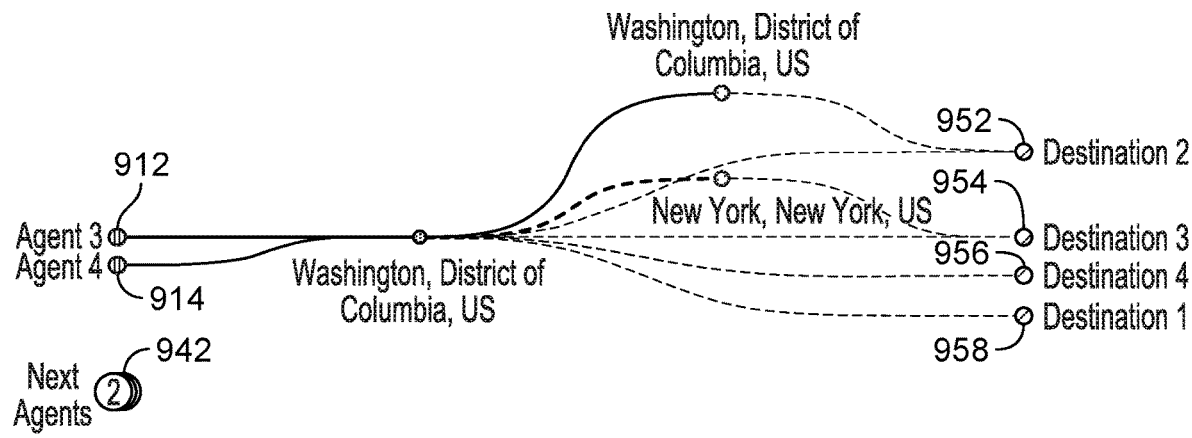
Figure 9E:
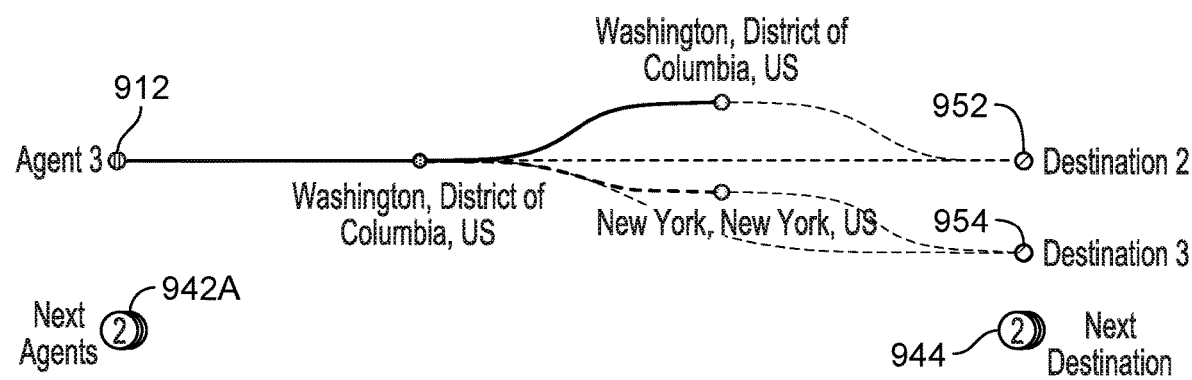

Further pagination may also be provided at 812, as discussed above. FIG. 9D depicts page 940A, which includes source (previous pivot) nodes 912 and 914, navigation tool 942 and destination nodes 952, 954, 956 and 958. In this example, destination nodes 952, 954, 956 and 958 are pivot nodes for further pagination. FIG. 9E depicts page 940B for which pivot nodes 952 and 954 have been sectioned into a separate page. Page 940/940A is thus further paginated based on destination nodes. In other embodiments, other pivot nodes might be used to paginate data further. Source node 912 is shown because paths from node 912 end at destination nodes 952 and 954. Because of filtering at 810, only remaining links and nodes that are part of paths through pivot nodes 952 and 954 are shown. Also shown are navigation tools 942A and 944. A subsequent page (not shown) would include destination/pivot nodes 956 and 958. Thus, the network performance data has been further paginated to show in detail a smaller portion of the topology.

Thus, a smaller, less complex visualization may be presented to the user. Because pivot nodes have been sorted, the pages that may be most interesting to the user can be presented first.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining a grouping characteristic for a plurality of nodes and a plurality of links, the plurality of nodes and the plurality of links corresponding to components of a network and having associated network performance information, the grouping characteristic includes at least one of partitionability into a plurality of pages and a hop distance; and
    generating a graphical visualization based on the grouping characteristic, the plurality of nodes and the plurality of links, for the grouping characteristic including the hop distance, the generating the graphical visualization including
        providing a group node in place of a subset of a portion of the plurality of nodes, the subset of the portion of the plurality of nodes having a particular hop distance;
        providing a link reference for the group node in place of a portion of the plurality of links between the subset of the portion of the plurality of nodes replaced by the group node; and
        providing replacement links to the group node in place of links to the subset of the portion of the plurality of nodes having the particular hop distance from nodes not replaced by the group node; and
    for the grouping characteristic including the partitionability into a plurality of pages, the generating the graphical visualization including
    determining a number of pivot nodes per page, the number of pivot nodes being static or dynamic, the number of pivot nodes being a maximum number of pivot nodes if the number of pivot nodes is dynamic; and
    generating a plurality of pages having the number of pivot nodes per page.

2. The method of claim 1, wherein the grouping characteristic is the partitionability into the plurality of pages and the plurality of nodes includes a plurality of pivot nodes, the generating the plurality of pages further comprising:
    sorting the plurality of pivot nodes based on at least one criterion;
    dividing the plurality of nodes into a plurality of sections such that each section of the plurality of sections includes not more than the number of pivot nodes, each section including a portion of the plurality of nodes and a portion of the plurality of links, each section corresponding to a page of the plurality of pages;

filtering the page for the portion of the plurality of nodes and the portion of the plurality of links; and displaying the page including the portion of the plurality of nodes and the portion of the plurality of links for a corresponding section and at least one navigation tool for navigating to at least one other page, a remaining portion of the plurality of nodes and a remaining portion of the plurality of links being omitted from the page.

3. The method of claim 2, wherein the at least one criterion is selected from packet loss, average latency, a pivot node group number.

4. The method of claim 2, further comprising:
receiving a navigation selection of the at least one navigational for an additional page; and
providing the additional page including an additional section of the plurality of sections, the additional page including an additional portion of the plurality of nodes and an additional portion of the plurality of links for an additional corresponding section and at least one additional navigation tool for navigating to at least one additional page.

5. The method of claim 2, wherein the grouping characteristic further includes a group type and wherein the generating the graphical visualization further comprises:
partitioning the plurality of nodes into a plurality of partitions based on the group type, a first partition including a first portion of the plurality of nodes having the group type;
generating at least one node group based on group properties for the first portion of the plurality of nodes, each of the at least one node group including a particular subset of the first portion of the plurality of nodes;
substituting a particular group node for each particular subset of the first portion of the plurality of nodes, a first portion of the plurality of links within the particular subset of the first portion of the plurality of nodes being replaced by at least one link reference; and
merging a second portion of the plurality of links to each particular subset of the first portion of the plurality of nodes such that the second portion of the plurality of links terminate at the group node for each subset.

6. The method of claim 5, wherein the grouping characteristic is selected from hop distance, agent, interface, destination and location.

7. The method of claim 1, wherein the grouping characteristic is the hop distance, wherein the plurality of links and the plurality of nodes correspond to a plurality of paths and wherein the providing the group node further comprises:
partitioning the plurality of nodes into a plurality of partitions based on a group type, a first partition including the portion of the plurality of nodes, the portion of the plurality of nodes having the group type;
generating at least one node group based on group properties for the portion of the plurality of nodes, a node group of the at least one node group including the subset of the portion of the plurality of nodes corresponding to the particular hop distance; and
substituting the group node for the subset of the portion of the plurality of nodes, the providing the link reference further including replacing a first portion of the plurality of links within the subset of the portion of the plurality of nodes with at least one link reference; the providing the replacement links further including
merging a second portion of the plurality of links to each subset such that the second portion of the plurality of links terminate at the group node for each subset and form the replacement links;
determining a plurality of paths for a remaining portion of the plurality of nodes and each group node;
determining the hop distance from a destination node for each node of the remaining portion of the plurality of nodes and each group node in each of the plurality of paths; and
disambiguating any group node for a subset having a looped path based on the hop distance.

8. The method of claim 7, wherein the disambiguating further includes:
determining whether a first group property for a first node matches a second group property of an adjacent node in each of the plurality of paths;
in response to determining the first group property matches the second group property, placing the first node in a first group with the adjacent node;
in response to determining the first group property does not match the second group property, determining whether a first hop distance for the first node matches a second hop distance for a second node;
in response to determining the first hop distance matches the second hop distance, adding the first node to a second node group; and
in response to determining the first hop distance does not match the second hop distance, creating a new group including the first node.

9. The method of claim 1, wherein the generating the graphical visualization further includes:
replacing a previous graphical visualization including additional with the graphical visualization.

10. A system, comprising:
a processor configured to:
determining a grouping characteristic for a plurality of nodes and a corresponding plurality of links, the plurality of nodes and the plurality of links corresponding to components of a network and having associated network performance information, the grouping characteristic includes at least one of partitionability into a plurality of pages and a hop distance; and
generating a graphical visualization based on the grouping characteristic, the plurality of nodes and the plurality of links, for the grouping characteristic including the hop distance, the generating the graphical visualization including
providing a group node in place of a subset of a portion of the plurality of nodes, the subset of the portion of the plurality of nodes having a particular hop distance;
providing a link reference for the group node in place of a portion of the plurality of links between the subset of the portion of the plurality of nodes replaced by the group node; and
providing replacement links to the group node in place of links to the subset of the portion of the plurality of nodes having the particular hop distance from nodes not replaced by the group node; and
for the grouping characteristic including the partitionability into a plurality of pages, the generating the graphical visualization including
determining a number of pivot nodes per page, the number of pivot nodes being static or dynamic, the number of pivot nodes being a maximum number of pivot nodes if the number of pivot nodes is dynamic; and generating a plurality of pages having the number of pivot nodes per page; and a memory coupled to the processor and configured to provide the processor with instructions.

11. The system of claim 10, wherein the grouping characteristic is the partitionability into the plurality of pages and the plurality of nodes includes a plurality of pivot nodes, and wherein the processor is further configured to:

sort the plurality of pivot nodes based on at least one criterion;

divide the plurality of nodes into a plurality of sections such that each section of the plurality of sections includes not more than the number of pivot nodes, each section including a portion of the plurality of nodes and a portion of the plurality of links, each section corresponding to a page of the plurality of pages, wherein the graphical visualization corresponds to the page;

filter the page for the portion of the plurality of nodes and the portion of the plurality of links; and display the page including the portion of the plurality of nodes and the portion of the plurality of links for a corresponding section and at least one navigation tool for navigating to at least one other page, a remaining portion of the plurality of nodes and a remaining portion of the plurality of links being omitted from the page.

12. The system of claim 11, wherein the at least one criterion is selected from packet loss, average latency, a pivot node group number.

13. The system of claim 11, wherein the processor is further configured to:

receive a navigation selection of the at least one navigational for an additional page; and provide the additional page including an additional section of the plurality of sections, the additional page including an additional portion of the plurality of nodes and an additional portion of the plurality of links for an additional corresponding section and at least one additional navigation tool for navigating to at least one additional page.

14. The system of claim 11, wherein the grouping characteristic further includes a group type and wherein to generate the graphical visualization, the processor is further configured to:

partition the plurality of nodes into a plurality of partitions based on the group type, a first partition including a first portion of the plurality of nodes having the group type;

generate at least one node group based on group properties for the first portion of the plurality of nodes, each of the at least one node group including a particular subset of the first portion of the plurality of nodes; and substitute a particular group node for each particular subset of the first portion of the plurality of nodes, a first portion of the plurality of links within the particular subset of the first portion of the plurality of nodes being replaced by at least one link reference;

merge a second portion of the plurality of links to each particular subset of the first portion of the plurality of nodes such that the second portion of the plurality of links terminate at the group node for each subset.

15. The system of claim 14, wherein the grouping characteristic is selected from hop distance, agent, interface, destination and location.

16. The system of claim 10, wherein the grouping characteristic is hop distance, wherein the plurality of links and the plurality of nodes correspond to a plurality of paths and wherein to provide the group node, the processor is further configured to:

partition the plurality of nodes into a plurality of partitions based on a group type, a first partition including the portion of the plurality of nodes, the portion of the plurality of nodes having the group type;

generate at least one node group based on group properties for the portion of the plurality of nodes, a node group of the at least one node group including the subset of the portion of the plurality of nodes corresponding to the particular hop distance; and substitute the group node for the subset of the portion of the plurality of nodes, to provide the link reference, the processor further being configured to replace a first portion of the plurality of links within the subset of the portion of the plurality of nodes with at least one link reference; to provide the link reference, the processor further being configured to merge a second portion of the plurality of links to each subset such that the second portion of the plurality of links terminate at the group node for each subset and form the replacement links;

determine a plurality of paths for a remaining portion of the plurality of nodes and each group node;

determine the hop distance from a destination node for each node of the remaining portion of the plurality of nodes and each group node in each of the plurality of paths; and disambiguate any group node for a subset having a looped path based on the hop distance.

17. The system of claim 16, wherein to disambiguate, the processor is further configured to:

determine whether a first group property for a first node matches a second group property of an adjacent node in each of the plurality of paths;

in response to a first determination that the first group property matches the second group property, place the first node in a first group with the adjacent node;

in response to a second determination the first group property does not match the second group property, determine whether a first hop distance for the first node matches a second hop distance for a second node;

in response to a third determination that the first hop distance matches the second hop distance, adding the first node to a second node group; and in response to a fourth determination that the first hop distance does not match the second hop distance, creating a new group including the first node.

18. A computer program product embodied in a non-transitory tangible computer readable storage medium and comprising computer instructions for:

determining a grouping characteristic for a plurality of nodes and a corresponding plurality of links, the plurality of nodes and the plurality of links corresponding to components of a network and having associated network performance information, the grouping characteristic includes at least one of partitionability into a plurality of pages and a hop distance; and generating a graphical visualization based on the grouping characteristic, the plurality of nodes and the plurality of links, for the grouping characteristic including the hop distance, the generating the graphical visualization including providing a group node in place of a subset of a portion of the plurality of nodes, the subset of the portion of the plurality of nodes having a particular hop distance;

providing a link reference for the group node in place of a portion of the plurality of links between the subset of the portion of the plurality of nodes replaced by the group node; and providing replacement links to the group node in place of links to the subset of the portion of the plurality of nodes having the particular hop distance from nodes not replaced by the group node; and for the grouping characteristic including the partitionability into a plurality of pages, the generating the graphical visualization including determining a number of pivot nodes per page, the number of pivot nodes being static or dynamic, the number of pivot nodes being a maximum number of pivot nodes if the number of pivot nodes is dynamic; and generating a plurality of pages having the number of pivot nodes per page.

19. The computer program product of claim 18, wherein the grouping characteristic is the partitionability into the plurality of pages and the plurality of nodes includes a plurality of pivot nodes, instructions for the generating the plurality of pages further comprising instructions for:

sorting the plurality of pivot nodes based on at least one criterion;

dividing the plurality of nodes into a plurality of sections such that each section of the plurality of sections includes not more than the number of pivot nodes, each section including a portion of the plurality of nodes and a portion of the plurality of links, each section corresponding to a page of the plurality of pages, wherein the graphical visualization corresponds to the page;

filtering the page for the portion of the plurality of nodes and the portion of the plurality of links; and displaying the page including the portion of the plurality of nodes and the portion of the plurality of links for a corresponding section and at least one navigation tool for navigating to at least one other page, a remaining portion of the plurality of nodes and a remaining portion of the plurality of links being omitted from the page.

20. The computer program product of claim 19, wherein the grouping characteristic further includes a group type and wherein the generating the graphical visualization further comprises:

partitioning the plurality of nodes into a plurality of partitions based on the group type, a first partition including a first portion of the plurality of nodes having the group type;

generating at least one node group based on group properties for the first portion of the plurality of nodes, each of the at least one node group including a particular subset of the first portion of the plurality of nodes;

substituting a particular group node for each particular subset of the first portion of the plurality of nodes, a first portion of the plurality of links within the particular subset of the first portion of the plurality of nodes being replaced by at least one link reference; and merging a second portion of the plurality of links to each particular subset of the first portion of the plurality of nodes such that the second portion of the plurality of links terminate at the group node for each subset.

21. The computer program product of claim 18, wherein the grouping characteristic is the hop distance, wherein the plurality of links and the plurality of nodes correspond to a plurality of paths and wherein the providing the group node further comprises:

partitioning the plurality of nodes into a plurality of partitions based on a group type, a first partition including the portion of the plurality of nodes, the portion of the plurality of nodes having the group type;

generating at least one node group based on group properties for the portion of the plurality of nodes, a node group of the at least one node group including the subset of the portion of the plurality of nodes corresponding to the particular hop distance; and substituting the group node for the subset of the portion of the plurality of nodes, the providing the link reference further including replacing a first portion of the plurality of links within the subset of the portion of the plurality of nodes with at least one link reference; the providing the replacement links further including merging a second portion of the plurality of links to each subset such that the second portion of the plurality of links terminate at the group node for each subset and form the replacement links;

determining a plurality of paths for a remaining portion of the plurality of nodes and each group node;

determining the hop distance from a destination node for each node of the remaining portion of the plurality of nodes and each group node in each of the plurality of paths; and disambiguating any group node for a subset having a looped path based on the hop distance.

22. The computer program product of claim 21, wherein the disambiguating further includes:

determining whether a first group property for a first node matches a second group property of an adjacent node in each of the plurality of paths;

in response to determining the first group property matches the second group property, placing the first node in a first group with the adjacent node;

in response to determining the first group property does not match the second group property, determining whether a first hop distance for the first node matches a second hop distance for a second node;

in response to determining the first hop distance matches the second hop distance, adding the first node to a second node group; and in response to determining the first hop distance does not match the second hop distance, creating a new group including the first node.

\* \* \* \* \*